United States Patent
Kosel et al.

(10) Patent No.: US 12,269,397 B2
(45) Date of Patent: Apr. 8, 2025

(54) DECORATIVE ELEMENT, VEHICLE COMPRISING SUCH A DECORATIVE ELEMENT, AND METHOD FOR PRODUCING A DECORATIVE ELEMENT

(71) Applicant: Bayerische Motoren Werke Aktiengesellschaft, Munich (DE)

(72) Inventors: Holger Kosel, Unterschleissheim (DE); Martin Schneebauer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 312 days.

(21) Appl. No.: 17/798,216

(22) PCT Filed: Apr. 21, 2021

(86) PCT No.: PCT/EP2021/060374
§ 371 (c)(1),
(2) Date: Aug. 8, 2022

(87) PCT Pub. No.: WO2021/224008
PCT Pub. Date: Nov. 11, 2021

(65) Prior Publication Data
US 2023/0130336 A1      Apr. 27, 2023

(30) Foreign Application Priority Data

May 7, 2020   (DE) .................. 10 2020 112 342.6

(51) Int. Cl.
*B60R 13/04*        (2006.01)
*B29C 65/56*        (2006.01)
(Continued)

(52) U.S. Cl.
CPC ............ *B60R 13/04* (2013.01); *B29C 65/565* (2013.01); *B29K 2083/005* (2013.01); *B29L 2031/3005* (2013.01)

(58) Field of Classification Search
None
See application file for complete search history.

(56) References Cited

U.S. PATENT DOCUMENTS

2009/0117398 A1    5/2009   Helmstetter et al.
2016/0312974 A1   10/2016   Kieslich
(Continued)

FOREIGN PATENT DOCUMENTS

DE        102007009583 A1 *  8/2008 ......... B29C 45/0053
DE     10 2007 052 849 A1    5/2009
(Continued)

OTHER PUBLICATIONS

Kieslich—WO 2004-099460 A2—PCT D1—MT—galvanically enhanced molded part—2004 (Year: 2004).*

(Continued)

*Primary Examiner* — John Vincent Lawler
(74) *Attorney, Agent, or Firm* — Crowell & Moring LLP

(57) ABSTRACT

A decorative element for the exterior of a vehicle includes a first component made of a first plastic and a second component made of a second plastic. The components are connected together, where the second component forms a translucent region, the first plastic can be galvanized, and the second plastic is made of silicone. A vehicle includes such a decorative element and a method is provided to produce the decorative element.

7 Claims, 1 Drawing Sheet

(51) Int. Cl.
  *B29K 83/00*   (2006.01)
  *B29L 31/30*   (2006.01)

(56) References Cited

U.S. PATENT DOCUMENTS

2017/0166107 A1* 6/2017 Salter ................ B60R 13/04
2019/0031090 A1* 1/2019 Stossel ................ B60Q 3/64

FOREIGN PATENT DOCUMENTS

| DE | 102014010255 A1 * | 4/2016 | ............ B32B 27/28 |
| DE | 10 2016 100 629 A1 | 10/2016 | |
| DE | 20 2016 106 848 U1 | 2/2017 | |
| DE | 20 2017 000 777 U1 | 4/2017 | |
| DE | 2020/1700777 U1 * | 4/2017 | ............ B60Q 3/00 |
| WO | WO-2004099460 A2 * | 11/2004 | ............ B44C 1/228 |

OTHER PUBLICATIONS

Kieslich—WO 2004-099460 A2—PCT D1—OG—galvanically enhanced molded part—2004 (Year: 2004).*

Dahinten—DE 102007009583 B4—PCT D4—MT—plastic part for autos—2008 (Year: 2008).*

Burghardt—DE 202017000777 U1—PCT D3—MT—galvanically coated article—2017 (Year: 2017).*

SyBridge—Two-Shot Molding vs. Overmolding—Dec. 16, 2020 (Year: 2020).*

Feldmann—DE 102014010255 A1—MT—two sections on trim—ABS—2016 (Year: 2016).*

Markarian—overmolding in new applications—Plastics Eng.—2017 (Year: 2017).*

International Search Report (PCT/ISA/210) issued in PCT Application No. PCT/EP2021/060374 dated Jun. 4, 2021 with English translation (five (5) pages).

German-language Written Opinion (PCT/ISA/237) issued in PCT Application No. PCT/EP2021/060374 dated Jun. 4, 2021 (four (4) pages).

German-language Search Report issued in German Application No. 10 2020 112 342.6 dated Mar. 12, 2021 with partial English translation (12 pages).

* cited by examiner

DECORATIVE ELEMENT, VEHICLE COMPRISING SUCH A DECORATIVE ELEMENT, AND METHOD FOR PRODUCING A DECORATIVE ELEMENT

BACKGROUND AND SUMMARY

The present invention relates to a decorative element for an exterior of a vehicle, having a first component composed of a first plastic and a second component composed of a second plastic, which are bonded to one another. The invention further relates to a vehicle having such a decorative element and to a process for producing such a decorative element.

In vehicle construction, decorative elements are used in order to impart a high-quality and individual appearance to the vehicle. For instance, decorative elements are used both in the interior of a vehicle and for the exterior of a vehicle. In the interior, decorative elements are increasingly being used with a light source disposed on the reverse side, which serve as ambient lighting. For the exterior, galvanized decorative elements are increasingly being used.

DE 10 2016 100 629 A1 discloses a galvanically decorated decorative element with contour lighting for the interior, manufactured from at least two plastic components in the cohesive bond, wherein a first plastic component is galvanizable and forms the decorative element, and at least one second plastic component is inert to galvanization, i.e. passes through the galvanic process uncoated and unchanged, and constitutes the translucent contour light region. Mounted on the reverse side, in the immediate proximity of the translucent contour light region, is a lamp. The second plastic component is made of an amorphous plastic, such as polyamide, and especially a polycarbonate, which have been rendered transparent, translucent or light-scattering.

It is the object of the present invention to provide a decorative element for a vehicle, and a vehicle having such a decorative element, which have improved stability to media and weathering and simultaneously improved optical properties. It is the further object of the invention to provide a process for producing a decorative element which is simple and inexpensive.

The objects are achieved by a decorative element, a vehicle having the decorative element, and a process for producing the decorative element, in accordance with the independent claims.

Advantageous configurations of the decorative element are addressed in the dependent claims.

In one aspect, a decorative element for an exterior of a vehicle is proposed. The decorative element has a first component made of a first plastic and a second component made of a second plastic, which are bonded to one another, where the second component forms a translucent region, and where the first plastic is galvanizable and the second plastic is made of silicone.

The use of silicone as the translucent region means that the decorative element is resistant to media and weathering. As a result, it is possible to use the decorative element for the exterior of a vehicle. In addition, the silicone has very good optical properties and is colorable and flexible. The silicone further provides a very good bond with the galvanizable component.

The decorative element may be used as a kidney frame. In addition, the decorative element may be used in all exterior parts that are in the field of vision and/or have been chromed.

In an advantageous configuration, the first component has a galvanic layer. The galvanic layer may be a metal layer. In an advantageous configuration, the galvanic layer surrounds the first component. The galvanic layer may be a chrome layer.

In an advantageous configuration, the silicone is a silicone elastomer. A silicone elastomer is colorable and flexible, and additionally has high impermeability.

In an advantageous configuration, the first plastic is composed of acrylonitrile-butadiene-styrene copolymer (ABS), of polyamide (PA), of a compound composed of acrylonitrile-butadiene-styrene copolymer (ABS) and polycarbonate (PC), or of a butadiene-containing copolymer. Such plastics are galvanizable, such that a metallic layer can be applied in a firmly adhering manner. Moreover, these plastics have high resistance to media and weathering and are thus suitable for exterior use.

In an advantageous configuration, the first component and the second component are bonded to one another in a form-fitting and/or cohesive manner. The use of silicone in the translucent region can achieve very good cohesion with the galvanizable first component.

In an advantageous configuration, the second component concludes in a form-fitting manner with an outer contour of the first component. This creates an outwardly uniform surface.

In an advantageous configuration, the first component has a first section and a second section, where the second component is disposed between the two sections. The second component thus divides the first component into two sections, with the second component forming the translucent region. The second component preferably cohesively bonds the two sections of the first component to one another.

In an advantageous configuration, the second component spans a section of the first component facing the vehicle. The side facing the vehicle may also be referred to as the reverse side. In particular, the second component lies in a recess of the first component in a form-fitting manner. For instance, a first section of the second components spans regionally the first section of the first component, and a second section of the second component spans regionally the second section of the first component. Advantageously, a first section of the second component lies in a recess of the first section of the first component, and a second section of the second component lies in a recess of the second section of the first component.

In an advantageous configuration, a lamp is provided, which is connected to the first component and/or the second component. For securing of the lamp, securing elements may project from the first component and/or the second component, for example in the form of at least one clip. In an advantageous configuration, the lamp is disposed on a side of the decorative element facing the vehicle.

In an advantageous configuration, the lamp comprises at least one light-emitting diode (LED) or a light-fed optical fiber element. The optical fiber element may have been provided with light-scattering particles. When light is coupled into the optical fiber element, rays of light enter the particles and are coupled out again thereby. Thus, light can be coupled out over the entire area of the optical fiber element. Such an optical fiber element is sold, for example, by Evonik Röhm GmbH as PLEXIGLAS® LED. Through the use of a light-emitting diode, it is possible to produce an energy-efficient and space-saving illumination. In an advantageous configuration, the lamp comprises multiple light-emitting diodes. Advantageously, the light-emitting diodes may have different colors that can be driven individually.

For instance, the light-emitting diode may comprise a red, green and blue light-emitting diode. Such a light-emitting diode is referred to as RGB-LED. In an advantageous configuration, the lamp comprises an organic light-emitting diode (OLED).

In a further aspect, a vehicle comprising at least one such decorative element is proposed.

The vehicle, on account of the use of silicone, has high resistance to weathering and media. In addition, through the use of at least one decorative element for the exterior, it is possible to individualize the vehicle. In addition, the decorative element imparts a high-quality impression to the vehicle.

In a further aspect, a process for producing a decorative element is proposed, having the process steps that follow. First of all, the first component composed of a galvanizable plastic is injection-molded. Subsequently, the second component composed of silicone is injection-molded onto the first component, such that the second component concludes in a form-fitting manner with the first component, especially an outer contour of the first component, and forms a translucent region. Subsequently, the two components are galvanized, with application of a galvanic layer solely to the first component. What is thus proposed is a process for producing a decorative element which is simple and inexpensive. Advantageously, the process is a 2-component injection molding process. Consequently, the decorative element is a 2-component article.

Advantageously, the first plastic is injected into a first cavity of an injection mold, and then the silicone is injected into a second cavity of the injection mold and injection-molded onto the first component.

Elucidated in detail hereinafter are a decorative element, a vehicle comprising a decorative element and a process for producing the decorative element, and also further features and advantages, with reference to a working example shown in schematic form in the figures.

DETAILED DESCRIPTION OF THE DRAWINGS

Figure 1:
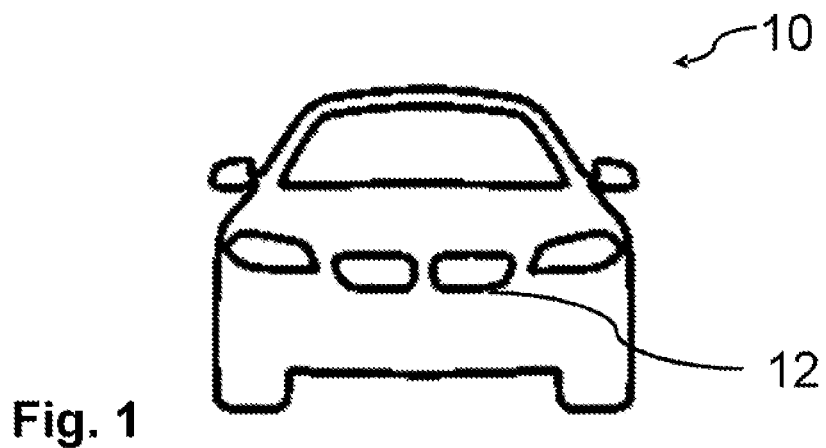
FIG. 1 is a schematic diagram of a vehicle having a decorative element.

FIG. 1 shows a vehicle 10, the exterior of which has been provided with a decorative element 12. The decorative element 12 in the present case is used as a kidney frame.

Figure 2:
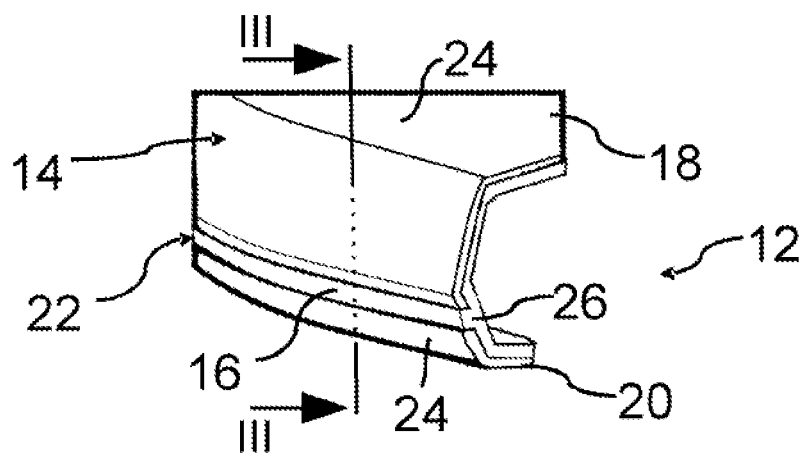
FIG. 2 is a perspective diagram of the decorative element.
Figure 3:
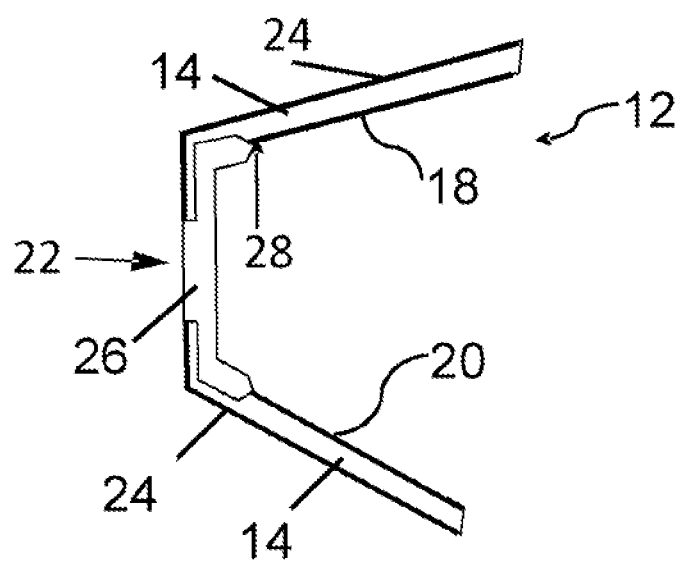
FIG. 3 a cross section through the decorative element shown in FIG. 2 along the line III-III.

As is apparent in FIGS. 2 and 3, the decorative element 12 has a first component 14 made of a first plastic and a second component 16 made of a second plastic, which are bonded to one another.

The first component 14 has a first section 18 and a second section 20, which are separated from one another by a clear space 22.

The first plastic, of which the two parts 18, 20 consist, is composed of a galvanizable plastic. In the present case, the plastic of the first component 14 is composed of acrylonitrile-butadiene-styrene copolymer (ABS). In addition, the first plastic may be composed of polyamide (PA), of a compound of acrylonitrile-butadiene-styrene copolymer (ABS) and polycarbonate (PC), or of a butadiene-containing copolymer.

As is apparent in FIG. 3, the two sections 18, 20 are provided with a galvanic layer 24, where the galvanic layer in this case is a chrome layer.

The second component 16 connects the two parts 18, 20 to one another, in that the second component 16 is cohesively bonded to the two parts 18, 20 and fills the clear space 22.

The second plastic is composed of silicone, especially of silicone elastomer, and forms a translucent region 26 within the clear space 22. Through the use of silicone in the translucent region 26, it is firstly possible to achieve improved cohesion with the two sections 18, 20, and the silicone is secondly resistant to media and weathering. Furthermore, silicone has very good optical properties and can be colored, and is additionally extremely flexible.

As is apparent in FIG. 3 in particular, the second component 16 spans regionally the first section 18 and the second section 20, with the second component 16 in each case lying in a form-fitting manner in a recess 28 in the two sections 18, 20.

There follows a description of a possible process for producing the decorative element 12. The decorative element 12 is produced by the 2-component injection molding method. For this purpose, first of all, the first plastic is injected into a first cavity of an injection mold. Subsequently, the silicone is injected into a second cavity of the injection mold, with the silicone being injection-molded onto the two sections 18, 20. Thereafter, the decorative element 12 is removed from the injection mold and galvanized directly, with application of the galvanic layer 24 solely to the two parts 18, 20 of the first component 14.

Through the use of silicone in the translucent region 26, it is possible to achieve very good cohesion with the galvanizable first component 14. Furthermore, silicone is resistant to media and weathering, and has very good optical properties. As a result, the decorative element 12 can be used for the exterior of the vehicle 10. In addition, silicone is colorable and flexible.

LIST OF REFERENCE NUMERALS 10 vehicle
12 decorative element
14 first component
16 second component
18 first section
20 second section
22 clear space
24 galvanic layer
26 translucent region
28 recess

The invention claimed is:

1. A decorative element for an exterior of a vehicle, comprising:
   a first component made of a first plastic; and
   a second component made of a second plastic, the first and second components being bonded to one another, wherein
   the second component forms a translucent region,
   the first plastic is galvanizable and the second plastic is made of silicone,
   the first component has a first section and a second section, and
   the second component is disposed between the first and second sections, wherein a portion of the first section, a portion of the second section, and a portion of the second component are all on an exterior surface of the decorative element.

2. The decorative element according to claim 1, wherein the silicone is a silicone elastomer.

3. The decorative element according to claim 1, wherein the first plastic is composed of acrylonitrile-butadiene-styrene copolymer, polyamide, a compound composed of acrylonitrile-butadiene-styrene copolymer and polycarbonate, or a butadiene-containing copolymer.

4. The decorative element according to claim 1, wherein the first component and the second component are form-fittingly and/or cohesively bonded to one another.

5. The decorative element according to claim 1, wherein the second component concludes in a form-fitting manner with an outer contour of the first component.

6. A vehicle comprising a decorative element according to claim 1.

7. A process for producing the decorative element of claim 1, comprising:
   a. injection molding the first component from a galvanizable plastic;
   b. injection molding the second component made of silicone onto the first component, such that the second component concludes in a form-fitting manner with the first component and forms the translucent region;
   c. galvanizing the first and second components, with application of a galvanic layer solely to the first component.

* * * * *